(12) United States Patent
Rising

(10) Patent No.: US 7,921,633 B2
(45) Date of Patent: Apr. 12, 2011

(54) SYSTEM AND METHOD EMPLOYING DIRECT GASIFICATION FOR POWER GENERATION

(75) Inventor: Bruce Rising, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1177 days.

(21) Appl. No.: 11/602,651

(22) Filed: Nov. 21, 2006

(65) Prior Publication Data

US 2008/0115495 A1    May 22, 2008

(51) Int. Cl.
*F02C 3/20* (2006.01)
(52) U.S. Cl. .................... 60/39.463; 60/780
(58) Field of Classification Search ............ 60/780, 60/781, 39.463, 39.47, 39.464, 39.182, 39.12, 60/39.52
See application file for complete search history.

(56) References Cited

U.S. PATENT DOCUMENTS

| | | | |
|---|---|---|---|
| 4,085,578 A * | 4/1978 | Kydd | 60/781 |
| 4,212,160 A * | 7/1980 | Blaskowski | 60/39.12 |
| 5,690,888 A | 11/1997 | Robert | |
| 5,755,839 A | 5/1998 | Malone | |
| 6,416,566 B1 * | 7/2002 | Kepplinger et al. | 75/446 |
| 7,739,864 B2 * | 6/2010 | Finkenrath et al. | 60/39.52 |
| 2005/0126156 A1 * | 6/2005 | Anderson et al. | 60/39.12 |

* cited by examiner

*Primary Examiner* — Michael Cuff
*Assistant Examiner* — Andrew Nguyen

(57) ABSTRACT

A power generation system (10) and method of operating a power generation system (10). An exemplary power generation system (10) shown in FIG. 1 includes a gasification system (2) for generating a supply (33) of a first gas comprising hydrogen and a supply (39) of a second gas comprising carbon monoxide based on a chemical breakdown of hydrocarbons in a melt (17). A component system (3) produces a supply of steam (99) by reacting one of the streams of gas and a steam turbine (120) generates mechanical power by expanding the steam (99). In an associated method, a melt (17) is created in a gasifier (12) which then receives a hydrocarbon source (22) to generate a continuous supply (33) of a first gas comprising hydrogen while increasing concentration of dissolved carbon in the melt (17). Hydrogen present in the first gas is supplied to a first combustor (90). A continuous supply (39) of a second gas comprising carbon monoxide is generated with carbon present in the melt (17). Carbon monoxide present in the second gas is supplied to a second combustor (80).

17 Claims, 6 Drawing Sheets

SYSTEM AND METHOD EMPLOYING DIRECT GASIFICATION FOR POWER GENERATION

BACKGROUND OF THE INVENTION

1. Field of the Invention

The present invention relates generally to power generation systems and, more particularly, to systems incorporating gasification processes.

2. Background Art

Integrated Gasification Combined Cycle (IGCC) systems present an opportunity to deploy coal, an abundant resource, in an economical and clean manner, bringing improved efficiency and cost over conventional coal-burning steam turbine power generation systems as well as Natural Gas Combined Cycle (NGCC) systems. In an IGCC system, a carbonaceous fuel such as coal, or heavy oil, or petroleum coke is converted to a gaseous fuel, termed syngas, a mixture formed by partial oxidation at elevated temperatures. Components of syngas vary considerably depending on the fuel source and reaction conditions. For coal gasification with compressed oxygen, typical constituents of syngas include $H_2$, $CO$, $CO_2$, and $CH_4$. In addition, syngas normally includes impurities such as sulfides, nitrogen components, and ash particles all of which are normally removed from the mixture prior to combustion in order to provide environmentally acceptable exhaust gases from the power system. Removal of these materials can introduce thermal inefficiencies to the overall gasification process.

IGCC and natural gas power generation systems commonly use air-fired combustors which produce exhaust containing a mixture of $CO_2$, $O_2$, $H_2O$, $N_2$ and nitrogen oxide products (e.g. $NO_x$). The $CO_2$ content in these gases is typically 3-5 percent by volume after combustion. To achieve a reduction of greenhouse gas emissions the $CO_2$ can be recovered from the combustion exhaust with various physical and chemical solvents. However, cost of such $CO_2$ capture is on the order of $150 per ton of carbon and this can increase the cost of electricity by 2.5 cents to 4 cents per kWh. Processes that can be used to extract $CO_2$ from the exhaust gases may also scrub NOx. However, additional steps for NOx removal may be necessary to meet regulatory standards It would therefore be advantageous to provide high efficiency power generation fuel processes which produce lower levels of greenhouse gases and contaminants which are costly to remove.

BRIEF DESCRIPTION OF THE DRAWINGS

Features of the invention will be best understood when the following detailed description is read in conjunction with the accompanying drawings, wherein.

DETAILED DESCRIPTION OF THE INVENTION

Figure 1:
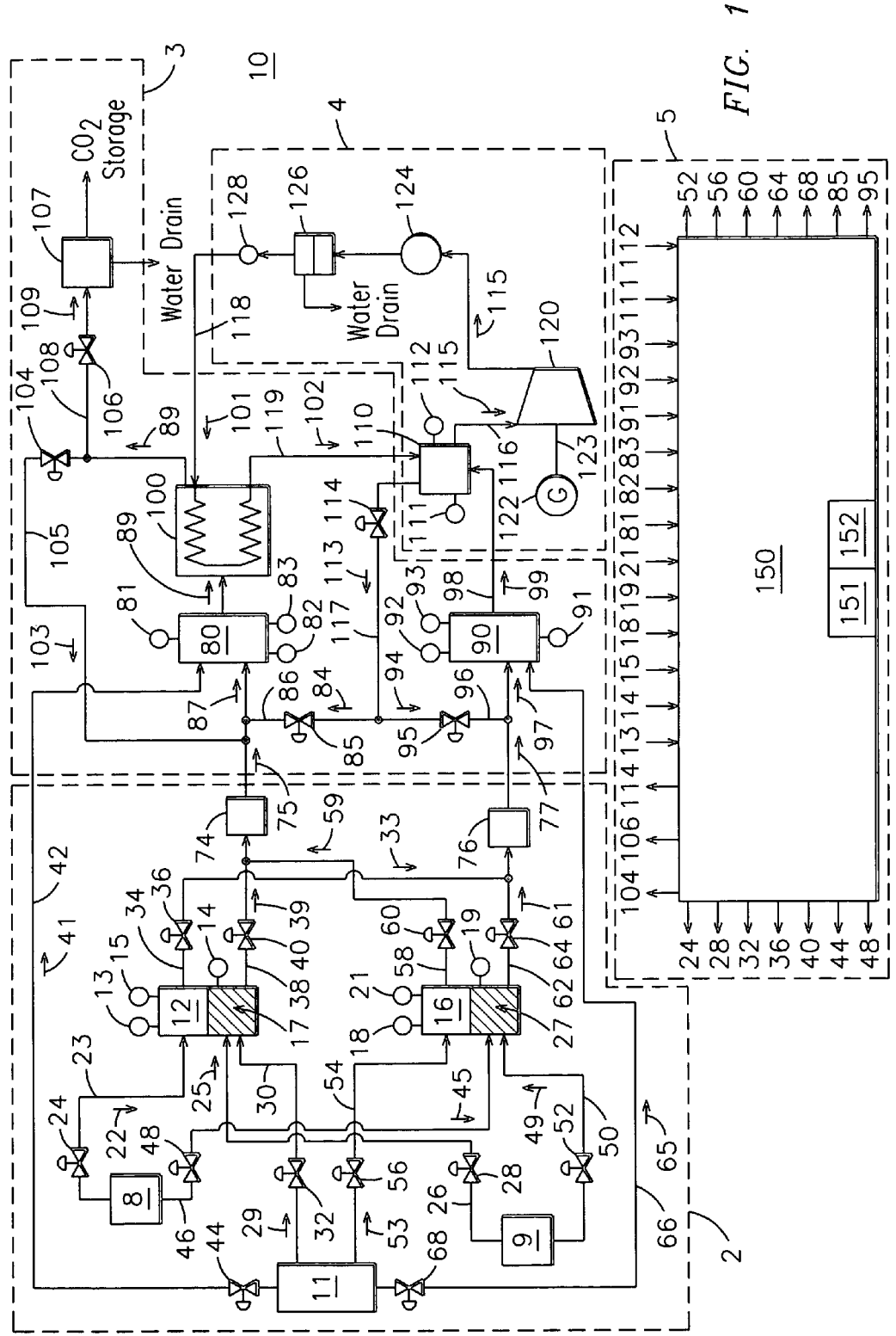
FIG. 1 illustrates a power generation system incorporating gasifiers and other features according to an embodiment of the invention.

In the example embodiments now illustrated, a direct gasification process generates separate streams of $H_2$ and CO from hydrocarbon material. The reactions take place in a melt of molten iron, although other materials, e.g., nickel, can be used in the reactor. Molten iron may be considered an ideal choice for the melt because it has a relatively high solubility for carbon.

In an exemplary process, a hydrocarbon feed is injected into the molten iron in the absence of an oxidant. The hydrocarbons breakdown, with free carbon atoms remaining dissolved in the melt. Simultaneously, as the hydrocarbons release carbon which remains in solution with the melt, hydrogen fuel gas is released from the melt. As the concentration of dissolved carbon in the melt increases, the solution, e.g., of molten iron and carbon, approaches a saturation level. At a point approaching the saturation level of carbon in the melt, the hydrocarbon feed to the melt is ceased and oxygen is injected into the melt. The dissolved carbon undergoes an exothermic reaction with the oxygen to form CO which is then released from the melt. As CO is formed, the concentration of carbon atoms dissolved in the melt decreases. When the carbon atom concentration reaches a predetermined minimum level, injection of the hydrocarbon feed can be resumed to dissolve newly disassociated carbon atoms and again release hydrogen fuel gas. The exothermic generation of CO produces more thermal energy than required for the endothermic breakdown of the hydrocarbon feed. The required temperature of molten iron in such a direct gasification process is generally in the range of 2250° F. (1232 C) for a melt containing four percent dissolved carbon by weight to 2800° F. (1538 C) for a melt containing one percent dissolved carbon by weight during the hydrogen generation phase; and in the range of 2800° F. (1538 C) during the CO fuel gas generation phase, where oxygen is blown into the melt.

In an example embodiment of a direct gasification power generation system, a cyclic output from multiple gasifiers is phased to produce separate and continuous streams of hydrogen and CO. Steam may be injected into the molten iron to limit the temperature of the melt during the exothermic CO generation phase and adjust the temperature to within the appropriate range during the hydrogen generation phase. The steam can react with the dissolved carbon to facilitate formation of hydrogen and carbon monoxide. Steam suitable for operation in an associated Rankine cycle may also be produced with products of the direct gasification process. A first supply of steam can be generated by combustion of the released hydrogen with an oxygen source and a second supply of steam can be developed with sensible heat recovered from exhaust gases exiting a CO combustor. In the CO combustor, the CO-containing gas produces $CO_2$ in an exothermic reaction with oxygen.

In another embodiment of the invention a $CO_2$ enrichment process can render $CO_2$ more cost effective. For example, exhaust from oxidation of a gas comprising CO and containing $CO_2$ may be re-injected with oxidant in a cyclic manner. As new $CO_2$ is added to a mixture of oxidant and $CO_2$—containing exhaust, the concentration of $CO_2$ in the exhaust is increased. In a direct gasification power generation system exhaust gases from the CO combustor, containing $CO_2$, can be injected into the same combustor to control the flame temperature. With continuous cycling of the $CO_2$—containing exhaust gas through the combustor, the concentration of $CO_2$ in the exhaust gas becomes elevated to a pre-determined level for the process conditions. Upon reaching the predetermined level, the $CO_2$ enriched exhaust gas is directed to a $CO_2$ separation unit for recovery and disposal. With an exhaust composition that is high in $CO_2$ concentration, e.g., 80%, recovery of the $CO_2$ is more economical than it would be in conventional systems wherein the $CO_2$ concentration is only on the order of about 10%. In addition, $NO_x$ emissions from gas combustors can be eliminated when oxygen, as opposed to nitrogen-containing air, is used in the combustors.

FIG. 1 illustrates an exemplary power generation system 10 incorporating features of the invention. The system 10 includes a direct gasification system 2, a steam generation system 3, a steam turbine system 4, and a control system 5. The direct gasification system 2 includes an oxygen supply 11, a first feed supply 8, and a second feed supply 9, two gasifiers 12 and 16, a CO fuel gas clean-up unit 74 and a hydrogen fuel gas clean-up unit 76. The steam generation system 3 includes a carbon monoxide combustor (CO combustor) 80, a hydrogen combustor 90, a Heat Recovery Steam Generator (HRSG) 100, and a $CO_2$ separation unit 107. The illustrated steam turbine system 4 is conventional, including a steam holder 110, a steam turbine 120, a generator 122, a condenser 124, a feed-water tank 126, and a feed-water pump 128. The control system 5 includes a controller 150 with a central processing unit 151 and a memory 152.

In the direct gasification system 2, the first gasifier 12 and the second gasifier 16 each separately generate supplies of both hydrogen and CO. The gasifiers 12 and 16 are each of the type comprising an iron melt 17 and 27 to effect breakdown of hydrocarbon material. The first gasifier 12 is provided with a first hydrocarbon feed 22 from a first feed supply 8 via a first feed supply line 23 and a second hydrocarbon feed 25 from a second feed supply 9 via a second feed supply line 26. An oxygen supply 11 provides a stream of oxygen 29 via a first oxygen supply line 30 to the gasifier 12. Flow of the first hydrocarbon feed 22 is controlled by a first feed valve 24, flow of the oxygen 29 is controlled by a first oxygen valve 32, and flow of the second hydrocarbon feed 25 is controlled by a second feed valve 28. Flow of a first hydrogen fuel supply 33 from the gasifier 12 and through the fuel line 34 is controlled by a first hydrogen fuel valve 36 positioned in the line 34. Flow of a first CO fuel supply 39 from the gasifier 12 and through fuel line 38 is controlled by a first CO fuel valve 40 in the line 38. Alternately, a swing valve may control the flows of the first hydrogen fuel supply 33 and the first CO fuel supply 39. Gas composition in the gasifier 12 is analyzed by a gas analyzer 15. Temperature of the melt 17 in the gasifier 12 is measured by a temperature sensor 14 and pressure of the gasifier 12 is measured by a pressure transmitter 13.

The first feed supply 8 provides a primary hydrocarbon fuel, such as a coal slurry to the direct gasification system 2 and the second feed supply 9 provides a light hydrocarbon source, i.e., a carbonaceous material having a relatively low carbon:hydrogen ratio compared to that of the first feed supply 8, e.g. such as natural gas. Mixing the first feed 21, e.g., a coal slurry, with the lower carbon:hydrogen ratio feed supply 25 can reduce the average carbon:hydrogen ratio in the gasifier 12 to less than 1. In order to generate a continuous stream of relatively pure hydrogen in the two-gasifier system, the duration of hydrocarbon fuel injection into the molten metal is made longer than the duration of oxygen injection into the molten metal as exhaust gases produced during transitions between the hydrocarbon injections and the oxygen injections are routed to the CO combustor. As the duration of hydrogen generation is limited by the maximum amount of carbon that can be dissolved into the molten metal, the carbon:hydrogen ratio of the combined hydrocarbon feed in each gasifier determines the durations of the hydrogen fuel gas generation phase and the CO fuel gas generation phase. For this reason, it may be preferable to have an effective carbon:hydrogen ratio of less than one, e.g., less than 0.85, in order to produce a continuous stream of hydrogen from two gasifiers.

The second gasifier 16 is provided with a third hydrocarbon feed 45 from the first feed supply 8 via a third feed supply line 46 and a fourth hydrocarbon feed 49 from the second feed supply 9 via a fourth feed supply line 50. The oxygen supply 11 provides a stream of oxygen 53 to the gasifier 16 via a second oxygen supply line 54. Flow of the third hydrocarbon feed 45 to the gasifier 16 is controlled by a third feed valve 48. Flow of oxygen 53 is controlled by a second oxygen valve 56. Flow of the fourth hydrocarbon feed 49 is controlled by a fourth feed valve 52. Flow of a second hydrogen fuel supply 61 from the gasifier 16 and through fuel line 62 is controlled by a second hydrogen fuel valve 64 in the line 62, and flow of a second CO fuel supply 59 from the gasifier 16 and through fuel line 58 is controlled by a second CO fuel valve 60 in the line 58. Alternately, a swing valve may control the flows of the second hydrogen fuel gas 61 and the second CO fuel gas 59. Gas composition in the gasifier 16 is analyzed by a gas analyzer 21. Temperature of the melt 27 in the gasifier 16 is measured by a temperature sensor 19 and pressure of the gasifier 16 is measured by a pressure transmitter 18.

The CO fuel gas clean-up unit 74 is positioned in the CO fuel supply line 38 between each one in the pair of the first and second CO fuel valves 40 and 60 and the CO combustor 80 to selectively receive either the CO fuel gas 39 from the gasifier 12 or the CO fuel gas 59 from the gasifier 16. CO received into the unit 74 is treated to remove undesirable impurities prior to combustion in the CO combustor 80. The hydrogen fuel gas clean-up unit 76 is positioned in the hydrogen fuel supply line 62 between each one in the pair of the hydrogen flow control valves 36 and 64 and the hydrogen combustor 90 to selectably receive either the hydrogen fuel gas 33 from the gasifier 12 or the hydrogen fuel gas 61 from the gasifier 16. Hydrogen received into the unit 76 is treated to remove undesired impurities prior to combustion in the hydrogen combustor 90.

The CO combustor 80 receives a fuel mixture 87, comprising cleaned CO fuel gas 75 produced by the unit 74, steam 84, and re-circulating exhaust gas 103. A stream of oxygen 41 is separately injected into the combustor 80 from the oxygen supply 11 via a third oxygen supply line 42. The CO fuel mixture 87 reacts with the supply of oxygen 41 in the CO combustor 80 to generate a high pressure, high temperature exhaust gas 89 which is sent to the Heat Recovery Steam Generator (HRSG) 100 and exits the HRSG as cooled exhaust gas 89. At least a portion of the cooled exhaust gas 89 is selectably re-circulated into the combustor 80 through line 105 under the control of valve 104. A second exhaust valve 106 selectively controls flow of $CO_2$ enriched exhaust gas 109 to a $CO_2$ separation unit 107 Upon reaching a predetermined level of $CO_2$ concentration, e.g. 70-90 percent by volume, the $CO_2$ enriched exhaust gas 109 is directed to a $CO_2$ separation unit 107. The CO combustor 80 is equipped with a pressure transmitter 81, a temperature sensor 82, and a gas analyzer 83.

The HRSG 100 receives feed-water from the steam turbine system 4 which, upon flowing therethrough, is converted into a supply of high pressure steam 102 that is routed to the steam holder 110 through line 119. In other designs, the HRSG 100 may be placed inside the CO combustor. A portion 113 of steam supplied by the steam holder 110 is routed along line 117 to lines 86 and 96 to provide two supplies of steam 84 and 94. Flow of the steam 113 is controlled by a first steam valve 114. Flow of the steam 84 to the CO fuel line 38 through line 86 is controlled by a second steam valve 85.

The hydrogen combustor 90 is provided with a fuel mixture 97, comprising cleaned hydrogen fuel 77 and steam 94. The supply of steam 94 enters the line 96 from the line 117 and flows into the fuel line 62. Flow of the steam 94 is controlled by a third steam valve 95 positioned in the line 96. A stream of oxygen 65 is separately injected into the combustor 90 from the oxygen supply 11 via a fourth oxygen supply line 66. The hydrogen fuel mixture 97 reacts with the supply of oxygen 65 in the hydrogen combustor 90 to generate a high pressure, high temperature source of steam 99 which is routed through line 98 to the steam holder 110. The hydrogen combustor 90 is equipped with a pressure transmitter 91, a temperature sensor 92, and a gas analyzer 93.

In the steam turbine system 4 the steam turbine 120 receives high pressure, high temperature steam 115 from the steam holder 110 along line 116. An electrical generator 122 is coupled to receive power from the steam turbine 120 through a rotor shaft 123. After expansion of the steam 115 in the turbine, the expanded steam 115 enters the condenser 124 for recycling as feed-water 101 which collects in a feed-water tank 126 and is then circulated with assistance of a feed-water pump 128 to the HRSG 100 in order to absorb heat and provide a new supply of steam 102.

An exemplary controller 150, illustrated as a microprocessor-based computer system, receives signals from the pressure transmitters 13, 18, 81, 91, and 111, the temperature sensors 14, 19, 82, 92, and 112, and the gas analyzers 15, 21, 83, and 93. The signals are each indicative of parameters associated with respective transmitters, sensors and analyzers. In response to these signals the controller 150 sends operational signals to the valves 24, 28, 32, 36, 40, 44, 48, 52, 56, 60, and 64 in the gasification system 2 and the valves 85, 95, 104, 106, and 114 in the steam generation system 3. Instructions for the interactive control of these various components of the system 10 may be in the form of code resident in the memory 152 of the controller 150 and executed by the associated central processing unit 151. The system 10 may be fully automated or may be under the control of an operator. To operate the system 10 in a fully automated mode, the operating and process conditions of each step required for generating a continuous supply of CO and $H_2$ are first characterized for a given combination of hydrocarbon feeds. The process sequence for direct gasification in the system 10 includes an Initial Start-Up step, a Hydrogen Supply Step, a CO Supply Step, and a Transition Step from the CO Supply Step to the Hydrogen Supply Step. The parameters associated with these steps are loaded into the memory 152 in order for the central processing unit 151 to control operations of the various components of the system 10 via control lines (not shown in FIG. 1) that are respectively connected from the controller 150 to the various valves.

Figure 2:
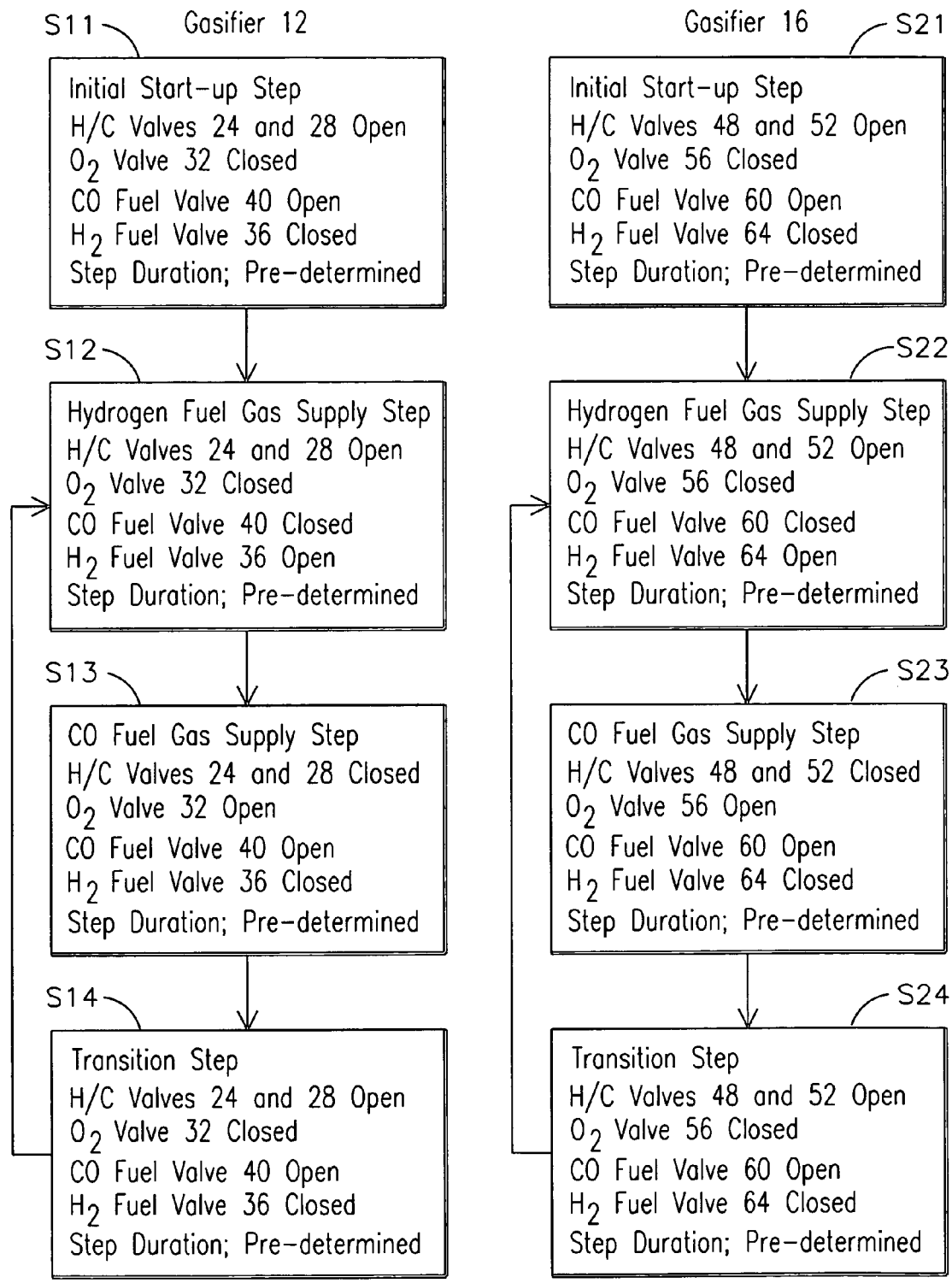
FIG. 2 is a flow chart illustrating exemplary process steps for direct gasification.

FIG. 2 illustrates an exemplary process sequence for direct gasification process in the system 10 to produce continuous streams of hydrogen fuel gas and CO fuel gas from the gasifiers 12 and 16. The process comprises a first sequence of steps S11-S14, performed with respect to operation of the gasifier 12, and a second sequence of steps S21-S24, performed with respect to operation of the gasifier 16.

During the Initial Start-Up Step (S11), hydrogen production is initiated in the gasifier 12. The hydrocarbon feed valves 24 and 28 to the gasifier 12 are open while the oxygen valve 32 is closed. The gasifier 12 receives a predetermined mixture of the first hydrocarbon feed 22 from the supply 8 and the second hydrocarbon feed 25 from supply 9. The initial fuel gas may not contain a sufficient concentration of hydrogen for consistent operation of the hydrogen combustor. Consequently the controller 150 maintains the first hydrogen fuel valve 36 in a closed position while maintaining the first CO fuel valve 40 in an open position. With this valve configuration the initial output from the gasifier 12 is routed through the first CO fuel line 38 and cleaned in the CO fuel gas clean-up unit 74. After a predetermined time the volume concentration of hydrogen in the gasifier 11 reaches a minimum desired level, e.g., 95 percent concentration, ending the Initial Start-Up Step (S11) and the Hydrogen Supply Step (S12) begins. In a well characterized process the end of Step (S11) is based on lapsed time. In other embodiments, the end of the Initial Start-Up Step may be based on data from the gas analyzer 15 which is indicative of the hydrogen concentration being output from the gasifier 12.

The amount of time required for the hydrogen generation to reach the minimum desired hydrogen concentration level depends on the carbon:hydrogen ratio resulting from the blend of hydrocarbon feeds 22 and 25. By modulating injection of the second hydrocarbon feed 25 relative to the first hydrocarbon feed 21, the time required to reach the pre-determined hydrogen concentration level can be varied. At the end of the Initial Start-Up Step (S11), the controller 150 generates signals to close the CO fuel valve 40 and open the hydrogen fuel valve 36. This initiates the Hydrogen Supply Step (S12), i.e., flow of a continuous stream of hydrogen from the gasifier 12 to the combustor 90. With this valve configuration the first hydrogen fuel supply 33 travels via the supply line 34 to the hydrogen fuel gas clean-up unit 76. The output of the hydrogen fuel gas clean-up unit 76, a relatively pure supply of hydrogen 77, is provided to the hydrogen combustor 90. Based on a prior process characterization, the hydrogen supply step ends after a pre-determined time, when the carbon concentration in the molten metal approaches the saturation level. The carbon:hydrogen ratio of the combined hydrocarbon feeds 22 and 25 is also determinative of the duration of the Hydrogen Supply Step (S12) and the volume of hydrogen output during this step. For example, the rate at which carbon reaches the saturation level will increase as the blend of the two fuel feeds 22 and 25 is varied to increase the carbon:hydrogen ratio.

When the carbon concentration in the molten metal approaches a predetermined concentration relative to the saturation level, e.g., after a predetermined time, the Hydrogen Supply Step ends and the system 1 transitions to the CO Supply Step (S13) with the controller 150 generating signals to open the CO fuel valve 40 and close the hydrogen fuel valve 36. At this time the controller also generates signals to place the hydrocarbon feed valves 24 and 28 in closed positions and place the oxygen valve 32 in an open position. Oxygen 29 injected into the melt reacts with carbon dissolved in the melt to produce a stream of CO 39 which flows from the gasifier 12 to the CO fuel gas clean-up unit 74 via the first CO fuel supply line 38. The duration of the CO Supply Step is limited by the amount of carbon that can be dissolved in the molten metal during the hydrogen generation phase. The CO Supply Step may be timed to end after a pre-determined time based on prior characterization of this step, e.g., a determination of the time required for carbon monoxide concentration in the gasifier output to fall below a set level.

On the basis of lapsed time or monitored CO output, the controller 150 begins the Transition Step (S14) to restart the hydrogen generation phase in the gasifier 12 by generating signals to close the valve 32 supplying oxygen to the gasifier 12 and to open the hydrocarbon feed valves 24 and 28, resuming supply of the feeds 22 and 25 to the gasifier 12. During the Transition Step, the controller 150 also generates signals to place the first hydrogen fuel valve 36 in a closed position while the first CO fuel valve 40 is maintained in an open position. With this valve configuration during the Transition Step, the output from the gasifier 12 is routed through the first CO fuel line 38 to the CO fuel gas clean-up unit 74. After a pre-determined time, when the concentration of hydrogen in the output from the gasifier 12 reaches a minimum desired level, e.g., 95 percent concentration, the system 10 resumes the Hydrogen Supply Step (S12).

As noted above with respect to the Initial Start-Up Step (S11), initiation of the Hydrogen Supply Step (S12) in a well characterized process may be based on lapsed time. In this instance, the system 10 may be held in the configuration of the Transition Step (S14) for a predetermined period before the controller 150 reconfigures the system 10 in accord with the Hydrogen Supply Step (S12). When the system 1 is reconfigured from the Transition Step (S14) to the Hydrogen Supply Step (S12), the controller 150 generates signals to close the CO fuel valve 40 and open the hydrogen fuel valve 36. The above-described sequence of the Hydrogen Supply Step (S12), the CO Supply Step (S13), and the Transition Step (S14) is repeated for the gasifier 12 while the gasifier 16 undergoes an analogous sequence of steps.

During the Initial Start-Up Step (S21) in the gasifier 16, the flow valves 48 and 52 are placed in open positions so that the gasifier 16 receives a mixture comprising the third hydrocarbon feed 45 from the feed supply 8 and the fourth hydrocarbon feed 25 from the feed supply 9 to begin producing hydrogen. At this time the controller 150 maintains the second hydrogen fuel valve 64 in a closed position while maintaining the second CO fuel valve 60 in an open position such that the initial gas output by the gasifier 16 is routed through the second CO fuel line 58 and cleaned in the CO fuel gas clean-up unit 74. As described for the Step (S11), the Initial Start-Up Step (S21) ends after a pre-determined time during which the concentration of hydrogen in the gasifier 16 reaches a minimum established level, e.g., 95 percent concentration; and the amount of time required for the hydrogen generation to reach this minimum level will depend on the carbon:hydrogen ratio of the feed blend, i.e., the blend of the hydrocarbon feeds 45 and 49. By modulating injection of the second hydrocarbon feed 49 relative to the first hydrocarbon feed 45 the time required to reach the established minimum hydrogen concentration level can be varied.

At the end of the Initial Start-Up Step (S21) for the gasifier 16, the Hydrogen Supply Step (S22) begins with the controller 150 generating signals to close the CO fuel valve 60 and open the hydrogen fuel valve 64. This allows flow of hydrogen fuel gas 61 to the hydrogen fuel gas clean-up unit 76 via the supply line 62. The output of the hydrogen fuel gas clean-up unit 76, a relatively pure supply of hydrogen 77, is provided to the hydrogen combustor 90. The Hydrogen Supply Step (S22) ends after a pre-determined time, when the carbon in the melt approaches the saturation level. The carbon:hydrogen ratio of the combined hydrocarbon feeds 45 and 49 determines the duration and output volume of the Hydrogen Supply Step (S22).

At the end of the Hydrogen Supply Step (S22), the controller 150 initiates the CO Supply Step (S23) by generating signals to open the CO fuel valve 60 and close the hydrogen fuel valve 64. The hydrocarbon feed valves 48 and 52 are placed in closed positions to cease flow of the hydrocarbon feeds 45 and 49 into the gasifier 16, and the oxygen valve 56 is placed in an open position to inject oxygen 53 into the molten metal of the gasifier 16. The oxygen 53 reacts with carbon dissolved in the molten metal melt to produce a stream of CO 59 which flows from the gasifier 16 to the CO fuel gas clean-up unit 74 via the second CO fuel supply line 58. The duration of the CO supply step is limited by the amount of carbon that can be dissolved in the molten metal during the hydrogen generation phase. The CO supply step in the gasifier 16 ends after a pre-characterized period of time lapses. Alternately, the gas analyzer 21 in the gasifier 16 may determine when the carbon concentration in the gasifier output falls below an established level.

When the controller 150 determines that the CO supply step is to be terminated, the controller 150 generates signals to close the oxygen valve 56 and to open the hydrocarbon feed valves 48 and 52. This initiates the Transition Step (S24) in the gasifier 16. During the Transition Step (S24), the controller 150 maintains the hydrogen fuel valve 64 in a closed position while maintaining the CO fuel valve 60 in an open position. With this valve configuration the gas being generated by the gasifier 16 during the Transition Step (S24) is routed through the second CO fuel line 58 and is cleaned in the CO fuel gas clean-up unit 74. After a pre-determined time, with the concentration of hydrogen in the gasifier 16 above a pre-determined level, e.g., 95 percent, the controller 150 sends signals to close the valve 60 and open the valve 64 to restart the hydrogen supply step (S22). The above sequence of the Hydrogen Supply Step (S22), the CO Supply Step (S23), and the Transition Step (S24) is repeated in the gasifier 16.

Figure 3:
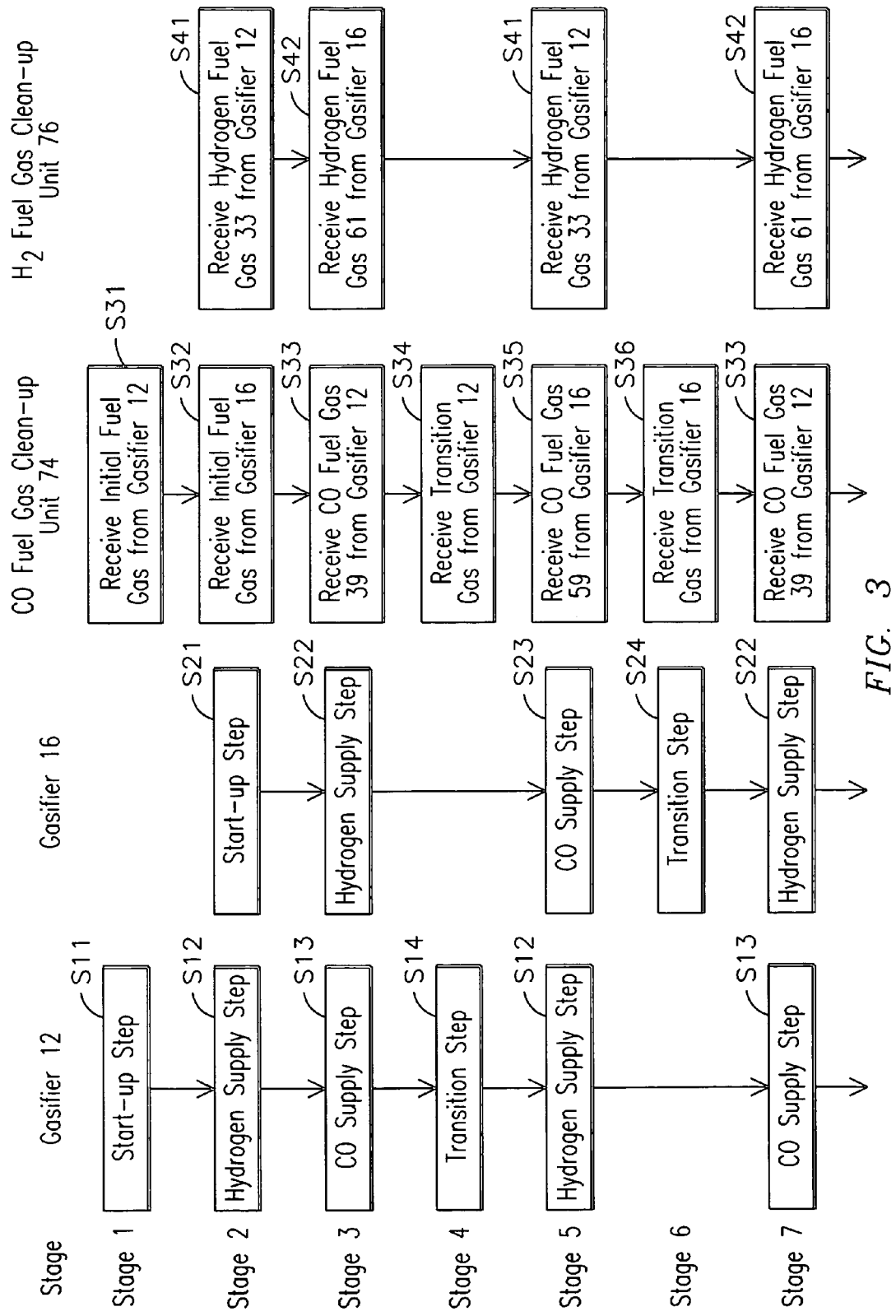
FIG. 3 illustrates exemplary stages of activities in components of the system of FIG. 1 according to the process steps of FIG. 2.

FIG. 3 illustrates an exemplary phasing of the two gasifier process sequences S11-S14 and S21-S24 in the system 10 as the gasifier 12 and the gasifier 16, together, generate continuous supplies of CO and hydrogen for processing in the gas clean-up units 74 and 76. The clean-up units output separate and continuous streams of hydrogen fuel gas and CO-containing fuel gas relatively free of undesirable impurities.

During Stage 1 the gasifier 12 operates in the Start-Up Step (S11), generating a stream of initial fuel gas by the reaction of a blend of the hydrocarbon feeds 22 and 25 with the molten metal. An initial output of fuel gas from the gasifier 12 is routed to the CO fuel gas clean-up unit 74(S31). The gasifier 16 and the hydrogen fuel gas clean-up unit 76 do not generate gases during Stage 1. Accordingly, the third and fourth feed valves 48 and 52, controlling flow of fuel to the gasifier 16, are in closed positions and the second hydrogen fuel valve 64, controlling hydrogen flow from the gasifier 16 to the hydrogen clean-up unit 76 is also in a closed position.

During Stage 2, with the output of fuel gas from the gasifier 12 having reached a minimum established level of hydrogen concentration, and valves 36 and 40 are configured to provide hydrogen 33 from the gasifier 12 to the clean-up unit 76(S41) according to the Hydrogen Supply Step (S12). During Stage 2 the gasifier 16 operates according to the Start-Up Step (S21) with the CO fuel gas clean-up unit 74 receiving an initial output of fuel gas from the gasifier 16 (S32).

In Stage 3, with the concentration of dissolved carbon having approached saturation in the melt of the gasifier 12, the gasifier 12 operates in accord with the CO Supply Step (S13). With the valve 40 in an open position, the CO fuel gas clean-up unit 74 receives the CO fuel gas 39 from the gasifier 12 (S33). Also during Stage 3, with the output of fuel gas from the gasifier 16 having reached a pre-determined level of hydrogen concentration, the gasifier 16 operates in accord with the Hydrogen Supply Step (S22), providing the hydrogen fuel gas 61 from the gasifier 16 to the hydrogen fuel gas clean-up unit 76 through the open valve 64 (S42).

During Stage 4 the gasifier 12 operates in the Transition Step (S14) while the gasifier 16 continues to operate in accord with the Hydrogen Supply Step (S22). During this stage the hydrogen fuel gas clean-up unit 76 continues to receive the hydrogen fuel gas 61 from the gasifier 16. During the Transition Step (S14) associated with the gasifier 12, the valve 32 is placed in a closed position to cease injection of oxygen to the melt of the gasifier 12, and the hydrocarbon feed valves 24 and 28 are opened to again dissolve carbon in the melt. During Stage 4, the valve 40 remains open so that the CO fuel gas clean-up unit 74 receives the transitionary output gas, i.e., gas containing less than the desired concentration of hydrogen, from the gasifier 12 (S34).

During Stage 5 the gasifier 12 again operates in accord with the Hydrogen Supply Step (S12) and the hydrogen fuel gas clean-up unit 76 receives the hydrogen fuel gas 33 from the gasifier 12 (S41). Also during Stage 5, the gasifier 16 begins operating in accord with the CO Supply Step (S23) and the CO fuel gas clean-up unit 74 receives the CO fuel gas 59 from the gasifier 16 (S35) through the open valve 60.

During Stage 6 the gasifier 12 continues with the Hydrogen Supply Step (S12), providing the hydrogen fuel gas 33 to the clean-up unit 76. During Stage 6 the gasifier 16 is in the Transition Step (S24) with the CO fuel gas clean-up unit 74 receiving the transitionary output gas, i.e., gas containing less than the desired concentration of hydrogen. This transitionary gas passes from the gasifier 16 through the valve 60 (S36). During the Transition Step (S24), the valve 56 is in a closed position to prevent injection of oxygen to the melt of the gasifier 16, and the hydrocarbon feed valves 48 and 52 are in open positions to resume breakdown of hydrocarbons and dissolve carbon in the melt. During this stage the concentration of hydrogen being output by the gasifier 16 increases to a pre-determined level of hydrogen concentration.

During Stage 7 the gasifier 12 operates in accord with the CO Supply Step (S13), with oxygen 29 flowing through open valve 32 and the CO fuel gas clean-up unit 74 receiving the CO fuel gas 39 (S33). The gasifier 16, having attained an output having the pre-determined level of hydrogen concentration, operates in accord with the Hydrogen Supply Step (S22), i.e., with the fuel valve 64 open so that the hydrogen fuel gas clean-up unit 76 receives the hydrogen fuel gas 61(S42).

The sequence of Stages 4 to 7 is repeated so that the fuel gas clean-up units 74 and 76 produce separate, continuous steams of cleaned CO-containing fuel gas for the CO combustor 80 and relatively pure hydrogen fuel gas for the hydrogen combustor 90 of the steam generation system 3.

Figure 4:
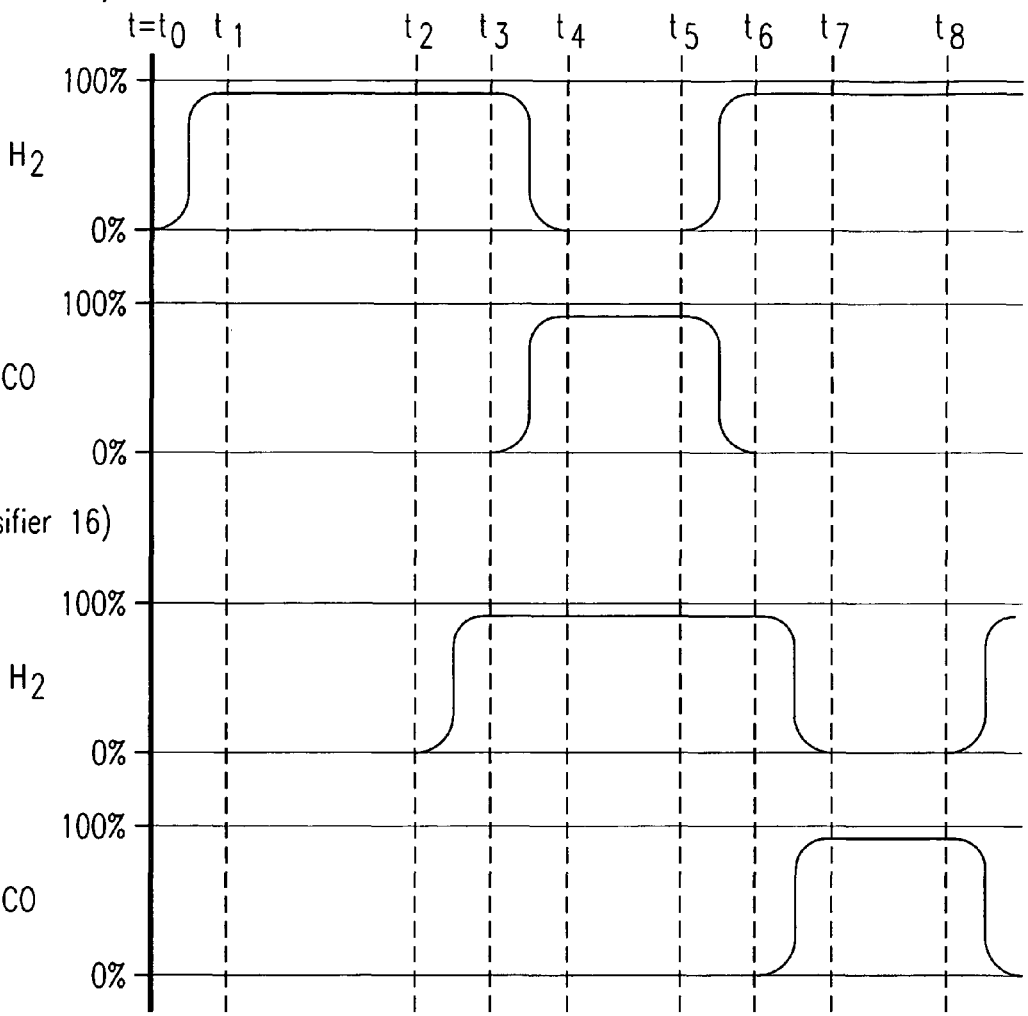
FIG. 4 illustrates exemplary transitions of the concentration of gases $H_2$ and CO being produced from gasifiers in the embodiment of FIG. 1.

FIG. 4 illustrates an exemplary sequence of changes in concentrations of hydrogen and CO in output gases from the gasifiers 12 and 16. At $t=t_0$, hydrocarbon feeds 22 and 25 are introduced to the gasifier 12 to initiate generation of hydrogen by the gasifier 12. Between $t=t_0$ and $t=t_1$ the concentration of hydrogen in the output gas from the gasifier 12 increases as the endothermic reaction of the hydrocarbon feeds 22 and 25 with the molten metal progresses. The output gas from the gasifier 12, an initial fuel gas, is routed to the CO fuel gas clean-up unit 74 to clean the hydrogen-containing gas before it is introduced to the CO combustor 80. During this time period the concentration of CO in the output from the gasifier 12 is very low as no oxygen is supplied through the valve 32. The gasifier 16 is at standby.

At $t=t_1$, the concentration of hydrogen in the output gas from the gasifier 12 reaches a pre-determined level and the hydrogen fuel gas 33 is directed to the hydrogen fuel gas clean-up unit 76 for cleaning prior to introduction to the hydrogen combustor 90. At $t=t_2$, the hydrocarbon feeds 45 and 49 are introduced to the gasifier 16.

During the period from $t=t_2$ to $t=t_3$ the concentration of hydrogen in the output gas from the gasifier 16 increases as the reaction of the hydrocarbon feeds 45 and 49 in the molten metal progresses. The output gas from the gasifier 16, an initial fuel gas, is routed to the CO fuel gas clean-up unit 74 to clean the hydrogen-containing gas before it is introduced to the CO combustor 80. During this time period the concentration of CO in the output from the gasifier 16 is very low as no oxygen is supplied through the valve 56. The gasifier 12 continues to receive the blend of hydrocarbon feeds 22 and 25 and the gasifier output is supplied to the hydrogen fuel gas clean-up unit 76 until $t=t_3$. At $t=t_3$, with the concentration of hydrogen in the output of the gasifier 16 having reached the pre-determined level, the stream of hydrogen fuel gas 61 output from the gasifier 16 is directed to the hydrogen fuel gas clean-up unit 76. Also during the time period from $t=t_2$ to $t=t_3$ the hydrocarbon feeds 22 and 25 to the gasifier 12 are shut off and oxygen 29 is supplied through the valve 32 to the melt in the gasifier 12 to generate CO from the carbon dissolved in the molten metal. With the valve 36 open, the CO fuel gas 33, output from the gasifier 12, is directed to the CO fuel gas clean-up unit 74.

During the time period from $t=t_3$ to $t=t_4$, the concentration of hydrogen in the output gas from the gasifier 12 decreases while the concentration of CO increases. At $t=t_4$ the output of CO from the gasifier 12 reaches a maximum and the output of hydrogen from the gasifier 12 approaches zero. At $t=t_5$, the dissolved carbon level in the gasifier 12 is depleted or is sufficiently reduced that the gasifier can transition to the hydrogen generation phase. With the valves 24 and 28 placed in open positions by the controller 150, the hydrocarbon feeds 22 and 25 are supplied to the gasifier 12. During the period from $t=t_5$ to $t=t_6$, the concentration of hydrogen in the output from the gasifier 12 increases as the reaction of the hydrocarbon feeds in the molten metal progresses and, simultaneously, the output of CO from the gasifier 12 decreases. Also during the period from $t=t_5$ to $t=t_6$ the gasifier 16 continues to receive the hydrocarbon feeds 45 and 49, supplying the hydrogen fuel gas 61 output therefrom to the hydrogen fuel gas clean-up unit 76 until at $t=t_6$ the concentration of hydrogen output by the gasifier 12 reaches the pre-determined level and the output of hydrogen fuel gas 33 from the gasifier 12 is routed to the hydrogen fuel gas clean-up unit 76. Also at $t=t_6$, with a stream of hydrogen fuel gas 33 being routed to the clean-up unit 76, the hydrocarbon feeds 45 and 49 to the gasifier 16 are shut off by closing the valves 48 and 52 and the valve 56 is opened to supply the oxygen 53 to the gasifier 16 in order to begin generating CO from the carbon dissolved in the molten metal.

During the transition period for the gasifier 16, from $t=t_6$ to $t=t_7$, the valve 60 is in an open position and the valve 64 is in a closed position so that the initial output from the gasifier 16 is directed to the CO fuel gas clean-up unit 74. This prevents any significant amounts of CO fuel gas released by the gasifier 16 from flowing to the hydrogen combustor 90. During this transition period from $t=t_6$ to $t=t_7$, the concentration of hydrogen in the output from the gasifier 16 decreases while the concentration of CO increases. At $t=t_7$ the output of CO from the gasifier 16 reaches a maximum and the output of hydrogen from the gasifier 16 approaches zero. At $t=t8$, the dissolved carbon level in the gasifier 16 is depleted or is sufficiently reduced that the gasifier 16 can transition to the hydrogen generation phase.

At $t=t_8$, with the valves 48 and 52 placed in open positions, the hydrocarbon feeds 45 and 49 are introduced to the gasifier 16 and the valve 56 is closed to cut off the supply of oxygen 53 to the gasifier 16. At time $t=t_8$ the concentration of hydrogen in the output from the gasifier 16 increases as the reaction of hydrocarbon feed in the molten metal progresses and simultaneously the concentration of CO decreases. During a period beginning at time $t=t_8$ the valve 64 is maintained in a closed position while the valve 60 is maintained in an open position so that the initial output during the transition of the gasifier 16 to hydrogen production is directed to the CO fuel gas clean-up unit 74 to prevent flow of significant amounts of CO to the hydrogen combustor 90, e.g., until the concentration of hydrogen reaches the pre-determined level.

The aforedescribed operational sequence of FIGS. 2 and 3 provides a continuous flow from the two gasifiers 12 and 16 of essentially pure hydrogen 77 from the hydrogen fuel gas clean-up unit 76, and a continuous flow of a gas containing a high concentration of CO from the CO fuel gas clean-up unit 74. More gasifiers may be added in the system 10 to increase the power generation capacity and improve the volumetric stability of the continuous flows of hydrogen and CO.

In another embodiment, a direct gasification steam power system with a hydrogen holder and a CO holder provides continuous streams of relatively pure hydrogen fuel gas and CO-containing fuel gas to a hydrogen combustor and a CO combustor. This configuration separates the fuel gas generation cycle from the power generation cycle as the hydrogen holder and the CO holder can provide continuous streams of hydrogen fuel gas and a CO containing gas to the hydrogen combustor and the CO combustor, respectively. Unlike the system 10, a second hydrocarbon feed is not required to control the carbon:hydrogen ratio, since the holders can serve as buffers for supplying continuous streams of fuel gases to the combustors. The hydrocarbon feed may comprise includes coal slurry, biomass, natural gas, or a combination thereof.

Figure 5:
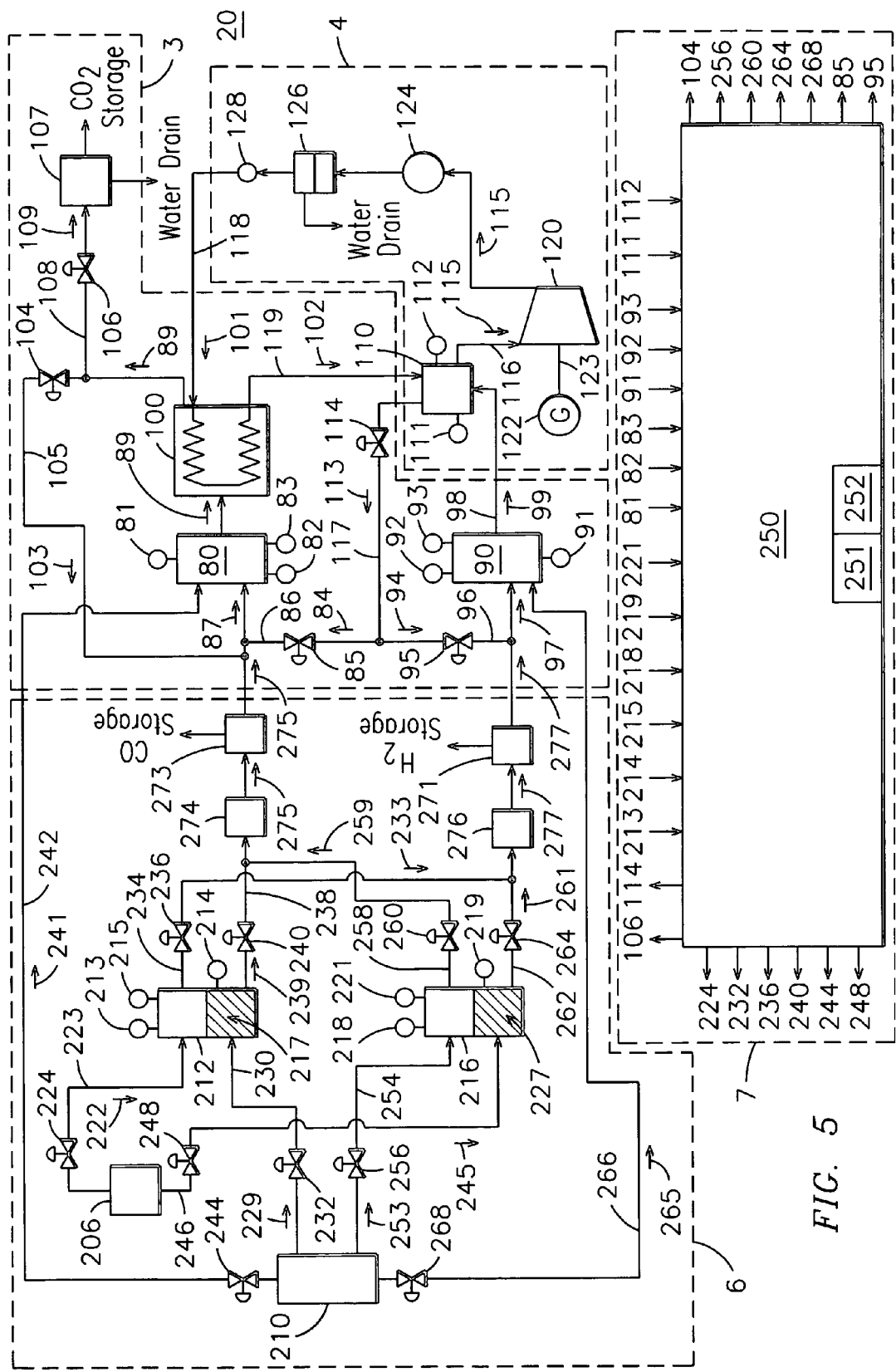
FIG. 5 illustrates a power generation system according to another embodiment of the invention.

The power generation system 20 of FIG. 5, includes a steam generation system 3 and a steam turbine system 4 as described with respect to FIG. 1, a direct gasification system 6 and a control system 7. The direct gasification system 6 includes an oxygen supply 210, a hydrocarbon feed supply 206, two gasifiers 212 and 216, a CO fuel gas clean-up unit 274, a hydrogen fuel gas clean-up unit 276, a hydrogen fuel holder 271, and a CO fuel holder 273. The gasifiers 212 and 216 each contain a melt 217 and 227 suitable for breaking down hydrocarbons from the feed supply. The control system 7 includes a controller 250 with a central processing unit 251 and a memory 252.

In the direct gasification system 6, the first gasifier 212 and the second gasifier 216 each generate separate supplies of hydrogen and CO. The first gasifier 212 is provided with a hydrocarbon feed 222, such as a coal slurry, from the feed supply 206 via a first feed supply line 223. An oxygen supply 210 provides a stream of oxygen 229 via a first oxygen supply line 230 to the gasifier 212. Flow of the hydrocarbon feed 222 is controlled by a first feed valve 224 and flow of the oxygen 229 is controlled by a first oxygen valve 232. Flow of a first hydrogen fuel supply 233 from the gasifier 212 and through the fuel line 234 is controlled by a first hydrogen fuel valve 236 positioned in the line 234. Flow of a first CO fuel supply 239 through the fuel line 238 from the gasifier 212 is controlled by a first CO fuel valve 240 in the line 238. Alternately, a swing valve may control the flows of the first hydrogen fuel supply 233 and the first CO fuel supply 239. Gas composition in the gasifier 212 is analyzed by a gas analyzer 215. Temperature in the melt 217 of the gasifier 212 is measured by a temperature sensor 214 and pressure in the gasifier 212 is measured by a pressure transmitter 213. The second gasifier 216 is provided with a hydrocarbon feed 245 from the feed supply 206 via a second feed supply line 246.

The oxygen supply 210 provides a stream of oxygen 253 to the gasifier 216 via a second oxygen supply line 254. Flow of the second hydrocarbon feed 245 to the gasifier 216 is controlled by a second feed valve 248. Flow of oxygen 253 is controlled by a second oxygen valve 256. Flow of a second hydrogen fuel supply 261 from the gasifier 216 and through fuel line 262 is controlled by a second hydrogen fuel valve 264 in the line 262, and flow of a second CO fuel supply 259 from the gasifier 216 and through the fuel line 258 is controlled by a second CO fuel valve 260 in the line 258. Alternately, a swing valve may control the flows of the second hydrogen fuel gas 261 and the second CO fuel gas 259. Gas composition in the gasifier 216 is analyzed by a gas analyzer 221. Temperature in the melt 227 of the gasifier 216 is measured by a temperature sensor 219 and pressure in the gasifier 216 is measured by a pressure transmitter 218. The CO fuel gas clean-up unit 274 is positioned in the CO fuel supply line 238 between each of the first and second CO fuel valves 240 and 260 and the CO combustor 80 to selectably receive either the CO fuel gas 239 from the gasifier 212 or the CO fuel gas 259 from the gasifier 216. CO received into the unit 274 is treated to remove undesirable impurities prior to combustion in the CO combustor 280. The hydrogen fuel gas clean-up unit 276 is positioned in the hydrogen fuel supply line 262 between each of the hydrogen flow control valves 236 and 264 and the hydrogen combustor 90 to selectably receive the hydrogen fuel gas 233 from the gasifier 212 or the hydrogen fuel gas 261 from the gasifier 216. Hydrogen received into the unit 276 is treated to remove undesired impurities prior to combustion in the hydrogen combustor 90.

The controller 250, illustrated as a microprocessor-based computer system, receives signals from the pressure transmitters 213, 218, 81, 91, and 111, the temperature sensors 214, 219, 82, 92, and 112, and the gas analyzers 215, 221, 83, and 93. The signals are each indicative of parameters associated with respective transmitters, sensors and analyzers. In response to these signals the controller 250 sends operational signals to the valves 224, 232, 236, 240, 244, 248, 256, 260, 264, and 268 in the gasification system 6 and the valves 85, 95, 104, 106, and 114 in the steam generation system 3. Instructions for the interactive control of these various components of the system 20 may be in the form code resident in the memory 252 of the controller 250 and executed by the associated central processing unit 251. The system 20 may be fully automated or may be under the control of an operator. To operate the system 20 in a fully automated mode, the operating and process conditions of each step required for generating supplies of CO and $H_2$ are first characterized. The process sequence for direct gasification in the system 20 also includes, for each of the gasifiers 212 and 216, an Initial Start-Up Step, a Hydrogen Supply Step, a CO Supply Step, and a Transition Step from the CO Supply Step to the Hydrogen Supply Step. The parameters associated with these steps are loaded into the memory 252 in order for the central processing unit 251 to control operations of the various components of the system 20 via control lines (not shown in FIG. 5) that are respectively connected from the controller 250 to the various valves.

Figure 6:
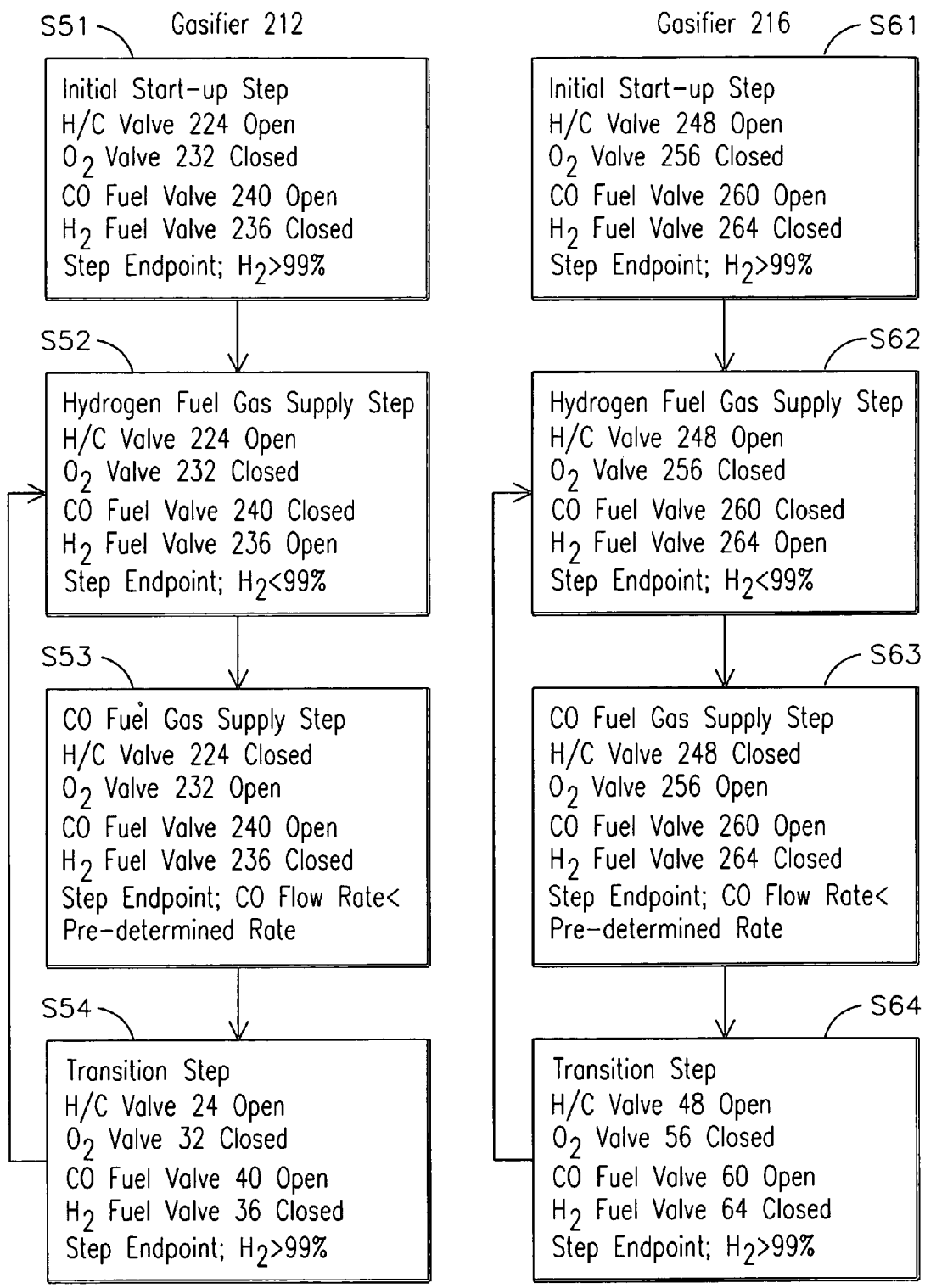
FIG. 6 is a flow chart illustrating exemplary process steps for the embodiment of FIG. 5.

FIG. 6 illustrates an exemplary process sequence of direct gasification in the system 20 to produce a stream of hydrogen-rich gas and a stream of CO containing gas from the gasifiers 212 and 216. The process comprises a first sequence of steps S51-S54, performed with respect to operation of the gasifier 212, and a second sequence of steps S61-S64, performed with respect to operation of the gasifier 216.

During the Initial Start-Up Step (S51) the gasifier 212 starts a hydrogen generation phase. The hydrocarbon feed valve 224 is open while the oxygen valve 232 is closed. The gasifier 212 receives the first hydrocarbon feed 222 from the supply 206 and begins producing hydrogen. The initial fuel gas may not contain a sufficient concentration of hydrogen for consistent operation of the hydrogen combustor 90. Consequently the initial gas output by the gasifier 212 is routed through the first CO fuel line 238 and cleaned in the CO fuel gas clean-up unit 274. The output of the CO fuel gas clean-up unit 274 is provided to the CO holder 273. The initial Start-Up Step ends once the concentration of hydrogen in the gasifier 212 reaches a pre-determined level, e.g., 99%. The transition may be based on data from a gas analyzer 215. In a well characterized process the transition may be based on lapsed time.

The Hydrogen Supply Step (S52) begins with the controller 250 generating signals to close the CO fuel valve 240 and open the hydrogen fuel valve 236. With this valve configuration the supply of hydrogen fuel gas 233 travels via the supply line 234 to the hydrogen fuel gas clean-up unit 276. The relatively pure hydrogen 277 output by the clean-up unit 276 travels to the hydrogen fuel holder 271. The Hydrogen Supply Step (S52) ends when the concentration of hydrogen being output by the gasifier 212 falls below 99% and contains an increased carbon component (e.g., comprising CO and CH4 as the carbon in the molten metal approaches the solubility limit. The carbon:hydrogen ratio of the hydrocarbon feeds 222 determines the duration of the hydrogen supply step as the carbon dissolution rate increases with the increased carbon:hydrogen ratio in the fuel feed 222. Endpoint of the Hydrogen Supply Step (S52) may be based on data from the gas analyzer 215. Alternately, in a well characterized process, the endpoint may be based on lapsed time.

The CO Supply Step (S53) begins with the controller 250 sending signals to open the CO fuel valve 240, close the hydrogen fuel valve 236, close the hydrocarbon feed valve 224 and open the oxygen valve 232. Oxygen 229 injected into the molten metal of the gasifier 212 reacts with dissolved carbon to produce a stream of CO 239 which flows to the CO fuel gas clean-up unit 274 via the first CO fuel supply line 238. The output 275 of the CO fuel gas clean-up unit 274 is a relatively pure supply of CO which is provided to the CO holder 273. The duration of the CO Supply Step is limited by the amount of carbon dissolved in the gasifier melt during the Hydrogen Supply Step (S52). The CO Supply Step in the gasifier 212 ends and the Transition Step (S54) begins when the rate at which CO is outgassed falls below a pre-set level. For example, once the carbon content in the melt drops to below one percent, a characteristic decline in the CO flow rate e.g., to 25 percent of a maximum flow rate, can be monitored with a pressure sensor to indicate this drop. With such a determination that the carbon concentration in the molten metal is sufficiently reduced, the hydrogen generation phase is resumed. In a well characterized process, endpoint of the CO Supply Step (S53) may be based on lapsed time. Alternately, optical techniques may be used to determine temperature stabilization as the carbon concentration diminishes.

The controller 250 initiates the Transition Step (S54) by generating signals to close the oxygen valve 232, open the hydrocarbon feed valve 224, close the first hydrogen fuel valve 236 and open the first CO fuel valve 240. With this valve configuration the gas output by the gasifier 212 during the Transition Step is routed through the first CO fuel line 238 and is cleaned in the CO fuel gas clean-up unit 274 before entering the CO fuel holder 273. The Transition Step ends and the Hydrogen Supply Step (S52) resumes once the concentration of hydrogen in the gasifier 212 reaches a pre-determined level, e.g., 99%. Initiation of the Hydrogen Supply Step (S52) after the Transition Step (S54) may be based on data from the gas analyzer 215 or, in a well characterized process, may be based on lapsed time. When the system 2 is reconfigured from the Transition Step (S54) to the Hydrogen Supply Step (S52), the controller 250 generates signals to close the CO fuel valve 240, and open the hydrogen fuel valve 236. The gasifier 212 cycles through the above-described sequence of the Hydrogen Supply Step (S52), the CO Supply Step (S53), and the Transition Step (S54) while the gasifier 216 undergoes an analogous sequence of steps.

During the Start-up Step (S61) the gasifier 216 receives the second hydrocarbon feed 245 from the feed supply 206 and begins producing hydrogen. At this time the controller 250 maintains the second hydrogen fuel valve 264 in a closed position while maintaining the second CO fuel valve 260 in an open position such that the initial gas output by the gasifier 216 is routed through the second CO fuel line 258 and cleaned in the CO fuel gas clean-up unit 274. The output of the CO fuel gas clean-up unit 274, a supply of CO containing gas 275, is provided to the CO holder 273. As described for the gasifier 212, the initial Start-Up Step of the gasifier 216 ends once the concentration of hydrogen in the gasifier 216 reaches a pre-determined level, e.g., 99% and the amount of time required for the hydrogen generation to reach the pre-determined level will depend on the carbon:hydrogen ratio of the hydrocarbon feed 245. The transition may be based on data from a gas analyzer 221 or may be based on lapsed time in a well characterized process.

At the end of the Initial Start-Up Step for the gasifier 216 (S61) the Hydrogen Supply Step (S62) begins with the controller 250 generating signals to close the CO fuel valve 260 and open the hydrogen fuel valve 264. This sends the hydrogen fuel gas 261 to the hydrogen fuel gas clean-up unit 276 via the supply line 262. The output of the hydrogen fuel gas clean-up unit 276, a relatively pure supply of hydrogen 277, is provided to the hydrogen holder 271. The Hydrogen Supply Step (S62) ends and the CO Supply Step (S263) begins when the concentration of hydrogen in the gas 261 falls below 90 percent, and the temperature of the melt reaches 2250° F. (1232 C) with the carbon concentration in the melt of the gasifier 216 having approached the solubility limit. Endpoint of the Hydrogen Supply Step (S62) may be based on data from the gas analyzer 221 or may be based on lapsed time in a well characterized process.

The controller 250 initiates the CO Supply Step (S63) by generating signals to open the CO fuel valve 260, close the hydrogen fuel valve 264, close hydrocarbon feed valve 248 to cease flow of the hydrocarbon feed 245 into the gasifier 216, and open the valve 256 to inject oxygen 253 into the gasifier melt. The oxygen 253 reacts with carbon dissolved in the melt to produce a stream of CO 259 which flows from the gasifier 216 to the CO fuel gas clean-up unit 274 via the second CO fuel supply line 258. The output of the CO fuel gas clean-up unit 274, a supply of relatively pure CO 275, is provided to the CO holder 273. The CO Supply Step (S63) ends and the Transition Step (S64) begins when the flow rate of CO falls below a predetermined level, indicating that the carbon concentration in the molten metal is sufficiently reduced to restart the hydrogen generation phase. The transition may be based on flow data, temperature monitoring or lapsed time.

To initiate the Transition Step (S64) in the gasifier 216, the controller 250 generates signals to close the oxygen valve 256 and to open the hydrocarbon feed valve 248. During the Transition Step, the controller 250 maintains the hydrogen fuel valve 264 in a closed position while maintaining the CO fuel valve 260 in an open position. With this valve configuration the gas output by the gasifier 216 during the Transition Step is routed through the second CO fuel line 258 and is cleaned in the CO fuel gas clean-up unit 274. The Transition Step (S64) ends and the Hydrogen Supply Step (S62) resumes once the concentration of hydrogen in the gasifier 216 reaches a pre-determined level, e.g., 95 percent. The transition may be based on data from the gas analyzer 221 or on lapsed time. The gasifier 216 cycles through the above sequence of the Hydrogen Supply Step (S62), the CO Supply Step (S63), and the Transition Step (S64).

As each of the gasifiers 212 and 216 cycle through a sequence of hydrogen supply, CO supply and transition the CO fuel holder 273 provides a continuous flow of the CO fuel gas 275 to the CO combustor 80 in the steam generation system 3 and the hydrogen fuel holder supplies a continuous flow of hydrogen fuel 277 to the hydrogen combustor 90.

With inclusion of the CO fuel holder 273 and the hydrogen fuel holder 277 the direct gasification power generation system can provide a continuous flow of a CO gas to the CO combustor and a continuous flow of hydrogen fuel gas to the hydrogen combustor from a single feed supply. That is, there is less need to control of the carbon:hydrogen ratio of blended fuel feeds and this can reduce complexity of the direct gasification system. In other embodiments incorporating the fuel holders 273 and 277, a single large capacity direct gasifier may be used to supply continuous streams of CO to the CO combustor and hydrogen to the hydrogen combustor. In other designs, more than two gasifiers may be included in the system to increase the power generation capacity.

While the preferred embodiments of the invention have been illustrated and described, it will be clear that the invention is not so limited. Numerous modifications, variations, substitutions and equivalents will occur to those skilled in the art without departing from the spirit and scope of the present invention as described in the claims.

The invention claimed is:

1. A method of operating a power generation system, comprising the steps of:
   providing a gasifier for receiving a hydrocarbon source; creating a melt in the gasifier;
   delivering a hydrocarbon feed into the melt to generate a continuous stream of a first gas comprising hydrogen while increasing concentration of dissolved carbon in the melt;
   supplying hydrogen present in the first gas to a first combustor;
   generating a continuous stream of a second gas comprising carbon monoxide with carbon present in the melt;
   supplying carbon monoxide present in the second gas to a second combustor;
   reacting hydrogen present in the first combustor with oxygen to generate steam; and
   delivering steam generated in the first combustor to a steam turbine for generation of electric power.

2. The method of claim 1 further including the step of forming CO2 in the second combustor by reacting the carbon monoxide with oxygen.

3. The method of claim 2 further including the step of generating steam with heat resulting from formation of CO2 in a second reactor.

4. The method of claim 3 further including the step of delivering steam with heat resulting from formation of CO2 to a steam turbine for generation of electric power.

5. The method of claim 1 wherein the hydrocarbon feed includes coal slurry, biomass, natural gas, or a combination thereof.

6. The method of claim 1 wherein the second gas containing carbon monoxide is generated by injection of oxygen into the melt.

7. The method of claim 1 wherein:
   at least two gasifiers are provided for receiving the hydrocarbon source and a melt is created in each gasifier;
   the hydrocarbon source is delivered into each melt in a manner which generates the continuous stream of the first gas comprising hydrogen; and
   the continuous stream of the second gas is generated from carbon present in each melt.

8. The method of claim 1 wherein the step of generating a continuous stream of the first gas includes alternately connecting each of two gasifiers to the first combustor when the gasifier is being fed from the hydrocarbon source and to the second combustor when the gasifier is generating CO.

9. The method of claim 1 wherein the step of generating a continuous stream of the first gas includes alternately producing the first gas from two gasifiers with one gasifier producing the first gas while a second gasifier is producing the second gas.

10. A power generation system comprising:
    a gasification system for generating a stream of a first gas comprising hydrogen and a stream of second gas comprising carbon monoxide based on a chemical breakdown of hydrocarbons in a melt;
    a system for producing a supply of steam by reacting one of the streams of gas; and
    a steam turbine for generating mechanical power by expanding the steam,
    wherein the system is configured to produce the supply of steam based on reacting hydrogen in the first gas with oxygen.

11. The system of claim 10 is further configured to produce the supply of steam based on heat generated from formation of CO2 from CO in the second gas.

12. A method of separating carbon dioxide from an exhaust gas comprising the steps of:
    a gasification system for generating a stream of a first gas comprising hydrogen and a stream of second gas comprising carbon monoxide based on a chemical breakdown of hydrocarbons in a melt;
    reacting the second gas comprising CO and steam in a combustor to form an exhaust output comprising CO2 wherein the supply of the steam is based on reacting the first gas comprising hydrogen with oxygen;
    a steam turbine for generating mechanical power by expanding the steam; and
    feeding at least a portion of the exhaust output back into the combustor while additional CO2 is being formed in the combustor to elevate the concentration of CO2 in the exhaust output.

13. The method of claim 12 wherein the at least a portion of the exhaust output is repeatedly fed back into the combustor until CO2 concentration in the exhaust output reaches a level of 70 to 90 percent by volume.

14. The method of claim 12 wherein, after elevating the concentration of CO2 in the exhaust output CO2 is removed from the exhaust output before the exhaust output is vented.

15. A power generation system comprising:
    a gasification system for generating a stream of hydrogen fuel gas and a stream of carbon monoxide fuel gas based on a chemical breakdown of hydrocarbons in a melt;
    a first combustor for producing a supply of steam by reacting the hydrogen fuel gas with oxygen;
    a second combustor for producing a supply of hot exhaust by reacting the carbon monoxide fuel gas with oxygen; and a steam turbine for generating mechanical power by expanding the steam from the first combustor and a steam generator.

16. The system of claim 15 further including a steam generator for producing a supply of steam by recovering thermal energy from the second combustor.

17. The method of claim 1 wherein the power generation system has a low CO2 emission level.

* * * * *